Dec. 19, 1933.  G. E. ADAMS  1,940,235
REFRIGERATING SYSTEM
Filed July 29, 1932   3 Sheets-Sheet 1

George E. Adams, Inventor

By Herbert E. Smith, Attorney

GEORGE E. ADAMS, Inventor

Dec. 19, 1933.  G. E. ADAMS  1,940,235
REFRIGERATING SYSTEM
Filed July 29, 1932   3 Sheets-Sheet 3
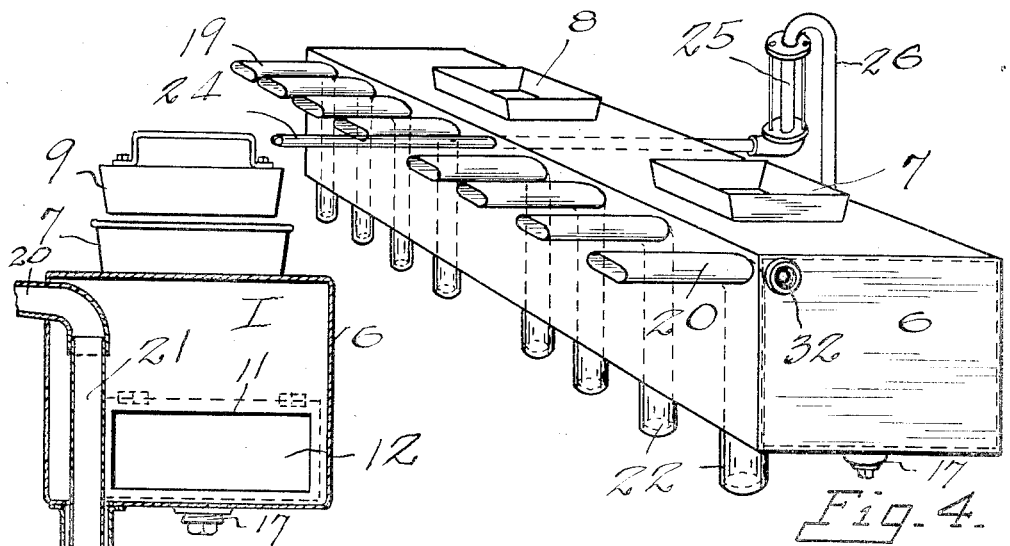
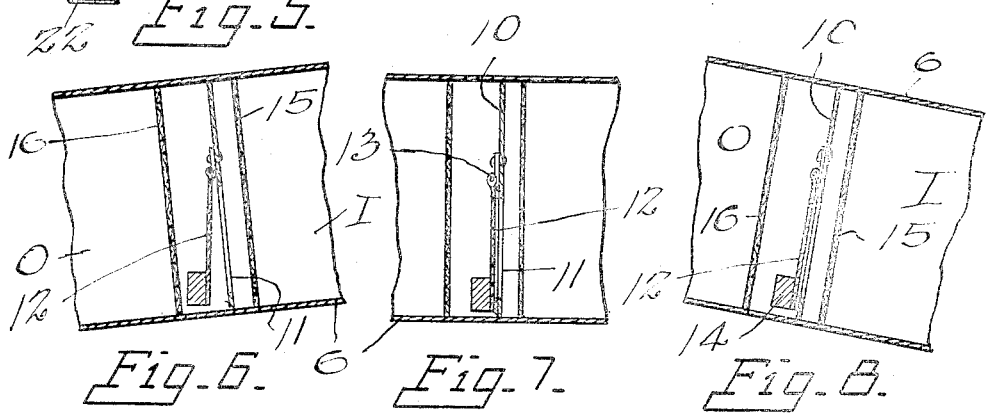
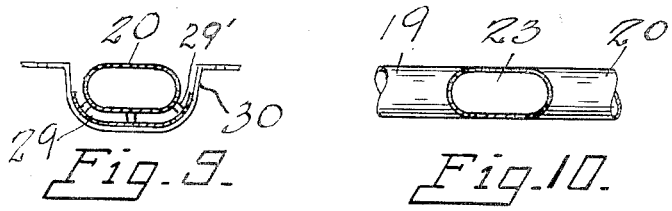
GEORGE E. ADAMS, Inventor Patented Dec. 19, 1933

1,940,235

UNITED STATES PATENT OFFICE 1,940,235

REFRIGERATING SYSTEM

George E. Adams, Spokane, Wash., assignor of one-half to Charles Wesley McCoy, Spokane, Wash.

Application July 29, 1932. Serial No. 626,052

6 Claims. (Cl. 62—101)

My present invention relates to an improved refrigerating system which, while adapted for use with various types of vehicles, is particularly designed for use with automotive trucks engaged in transporting perishable commodities. The refrigerating system involves the employment of ice and brine, and the liquid refrigerant is automatically circulated responsive to lateral swaying or side tilting of the traveling vehicle. As is well known the dimensions of the trucks are restricted, especially as to height, in order that the truck may enter a garage door, and pass under a bridge or other overhead structure with ample clearance, and at the same time the interior of the truck must be unobstructed as much as possible to insure a maximum storage capacity. To meet these conditions, and also to insure maximum refrigerating of the air within the truck together with a uniform and natural distribution of the refrigerated air, the refrigerating equipment according to my invention is compactly arranged in the upper part of the interior of the storage space of the truck, as close to the roof of the storage space as possible.

In carrying out my invention I utilize a siphon and pump for the initial circulation of the liquid refrigerant, and thereafter the circulation of the refrigerant is automatically maintained through movements responsive to the side swaying or lateral tilting of the traveling vehicle.

Means are also provided whereby the liquid circulating system may be converted from a refrigerating apparatus into a heating apparatus for warming the interior of the closed vehicle during winter months.

The refrigerating equipment includes an overhead tank and overhead coils, with a partition dividing the tank into an inlet chamber and an outlet chamber that are connected with the coils, and a gate or valve is located in the tank to permit flow of liquid refrigerant in one direction only through the tank, thus maintaining a continuous flow in one direction only from the outlet chamber, through the coil, back to the inlet chamber, and thence to the outlet chamber.

The invention consists in certain novel combinations and arrangements of parts, as above indicated, and as will be more fully described in connection with the illustrations of the drawings. In the accompanying drawings I have illustrated one complete example of the physical embodiment of my invention wherein the parts are combined and arranged in accord with one mode I have thus far devised for the practical application of the principles of my invention, but it will be understood that various changes and alterations may be made in the exemplified structure within the scope of my claims, without departing from the principles of my invention.

Figure 4 is a perspective view of the transversely arranged brine tank, showing the refrigerating coil connected thereto and the siphon arrangement for initiating the circulation of the liquid refrigerant.

Figure 5 is a vertical transverse sectional view through the tank and the enclosed end of a coil-pipe, as at line 5—5 of Figure 2.

Figures 6, 7, and 8 are vertical sectional detail views at the longitudinal center of the divided brine tank, showing various positions of the tank responsive to the lateral sway of the vehicle and the corresponding positions of the control gate or valve between the chambers of the tank.

Figure 2:
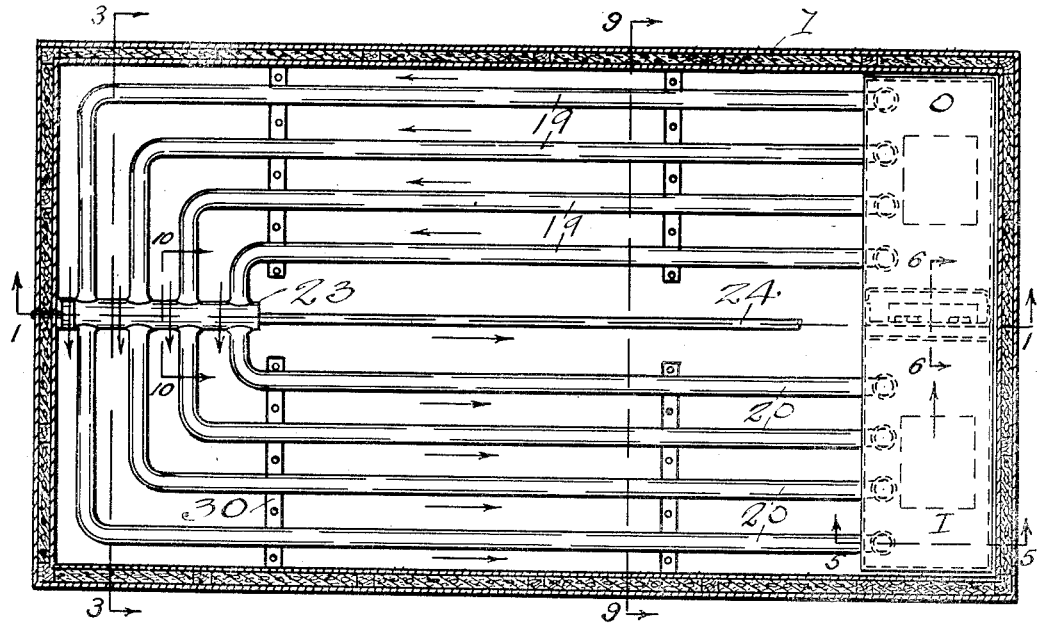
Figure 2 is a horizontal sectional view at line 2—2 of Figure 1, just below the roof of the truck, and showing a top plan view of the equipment.

Figure 9 is a transverse sectional detail view of one of the flat coil-pipes, with its waste trough, and strap hanger, as at line 9—9 of Figure 2.

Figure 10 is a vertical transverse sectional view at line 10—10 of Figure 2 showing the header intermediate the outlet pipe and the inlet pipe of the coil.

Figure 1:
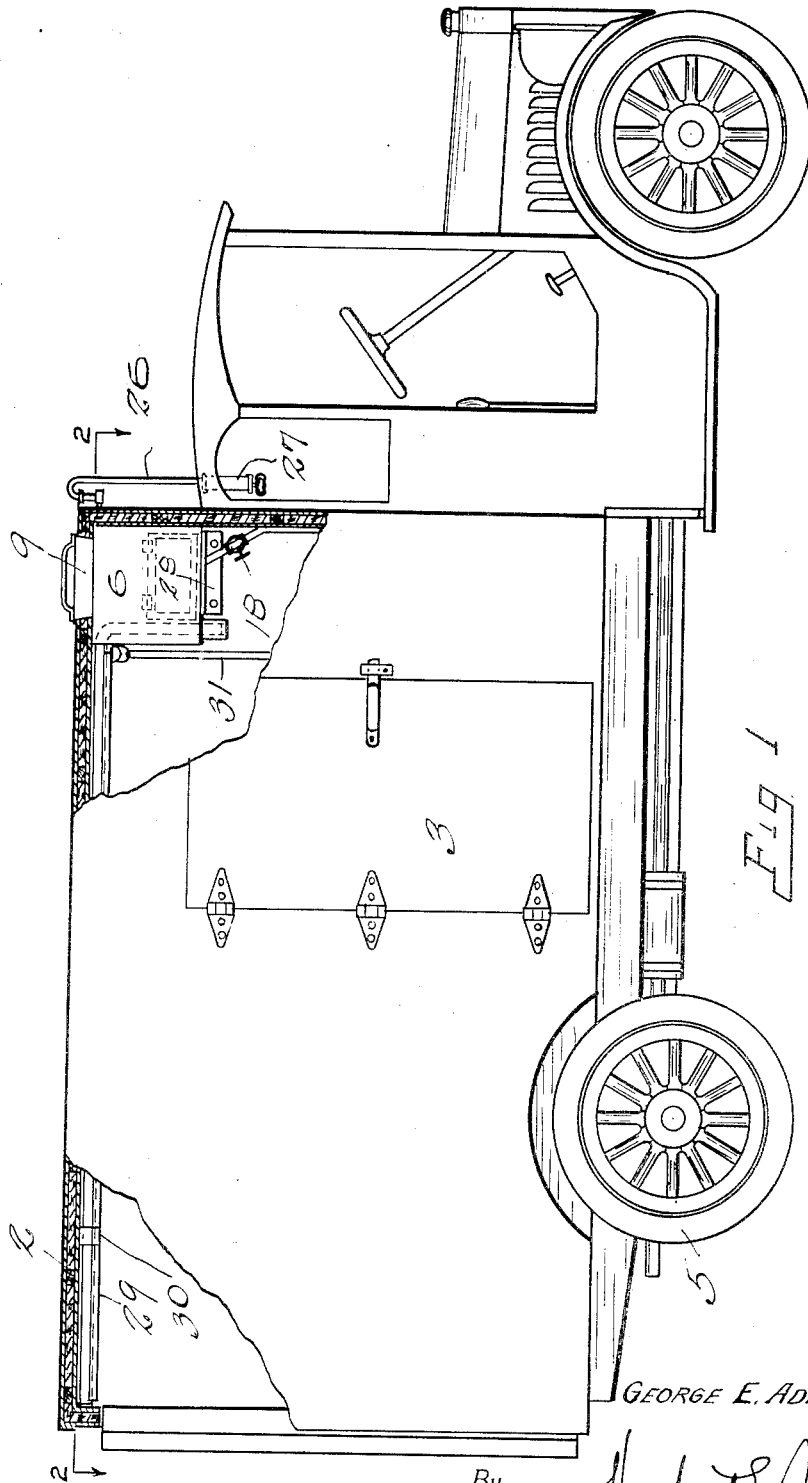
Figure 1 is a view in side elevation of a van or closed automotive truck adapted to transport perishable commodities, parts of the body of the truck being broken away and shown in section for convenience of illustration in the disclosure of the refrigerating equipment.

In order that the general arrangement and relation of parts may readily be understood I have shown in Figure 1 a typical, closed truck suitable for transporting perishable commodities, or goods that require refrigeration, having heat-insulated walls 1 and roof 2, and with side doors 3 and end doors 4 for access to the interior storage space of the truck. The closed truck may or may not be of the automotive type, but is provided with usual wheels 5, cab C, and other necessary accessories.

Figure 3:
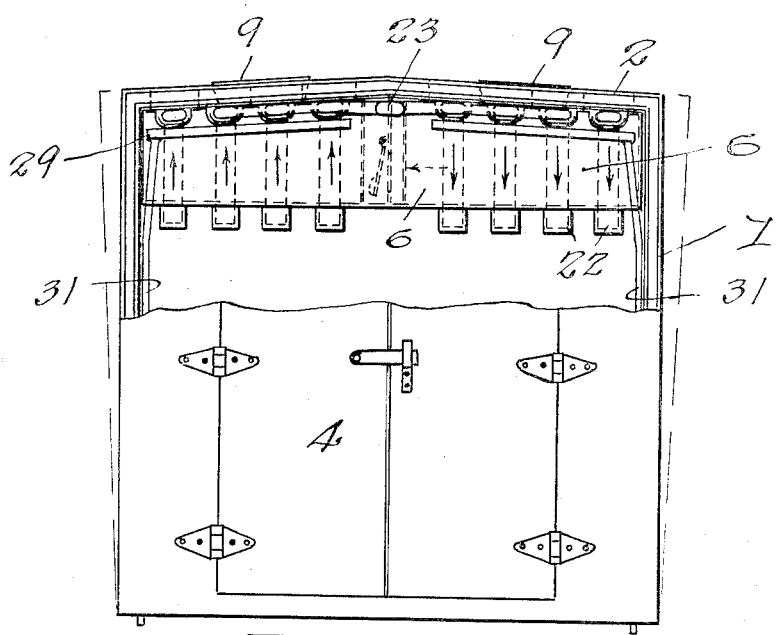
Figure 3 is a rear end view of the body of the vehicle partly broken away to disclose the arrangement of the equipment transversely of the vehicle, parts being broken away as at line 3—3 of Figure 2, dotted lines showing movements of the vehicle.

In the forward end of the storage space, and just under the roof, I provide a brine tank 6, which extends transversely of the vehicle, and which tilts from side to side of the vehicle as the latter sways laterally while traveling, as indicated by dotted lines in Figure 3. The brine tank is provided with two spaced openings, having flanges 7 and 8, and these openings are spaced at opposite sides of the longitudinal center of the tank and located in the top wall of the tank. The flanges project upwardly through holes in the roof of the vehicle, and these openings provide hatches or man-holes through which ice and salt water or brine may be introduced to the tank, from the roof of the truck, after which the manholes are closed by the usual pair of removable plugs as 9.

Within the tank is arranged a vertical partition 10 that extends longitudinally of the vehicle and forms a central dividing wall with an inlet chamber I at one side thereof and an outlet chamber O at the other side thereof. In the lower half of the partition or dividing wall 10 an opening 11 is provided for flow of brine from the inlet chamber I to the outlet chamber O, but a reverse flow of the liquid refrigerant is prevented by means of the gate or valve 12. This valve or gate is hinged at its upper edge 13 to the partition on the outlet side of the tank, and a weight 14 attached at the lower free edge of the gate tends to swing the gate to closed position, and to hold it in such position. As indicated in Figure 6, when the vehicle sways to the left side, the gate is opened and the liquid refrigerant flows through the opening 11. In Figure 7, which shows the vehicle in position where the tank is level, and in Figure 8 where the vehicle is indicated as swaying to the right side, the gate is closed and held closed by gravity, or by the pressure of the liquid in the outlet chamber.

To prevent interference with the operation of the gate by the chunks of ice in the chambers I and O, reticulated screens 15 and 16 are provided at opposite sides of the partition, and these screens, which do not interfere with the free flow of the refrigerant, prevent the ice from contacting with the partition and with the gate.

A usual drain pipe 17 is provided at the bottom of the tank, and a cut off valve 18 is provided in the pipe for preventing loss or waste of the brine.

A horizontally arranged coil is connected at the rear side of the tank, and located directly beneath, and as close as possible to the inner side of the roof 2 of the truck, and from this coil on which the frost accumulates, downwardly moving cold air currents radiate and are distributed throughout the entire storage space or interior of the closed truck, for conditioning the air therein, and maintaining the commodities at a desired and uniform temperature.

The coil, as indicated in Figure 2, includes a plurality of parallel pipes 19 connected with the outlet chamber and a complementary set of intake pipes 20 connected to the intake chamber, and the flow or circulation of the brine is indicated by the arrows in Figure 2.

At one end, each pipe of the coil is connected with the tank through the use of an upright spout 21 located within the tank, and the open end of each spout terminates in a sump 22 which is located below the bottom of the tank but which is in open communication with the interior of the tank. At its other end, each horizontally disposed pipe of the coil is connected directly to a header or tube 23 that is located at the rear of the closed truck and extends, horizontally, along the longitudinal center of the truck. The header is thus in communication with each of the pipes of the coil, and it will be understood that, in the automatic circulation of the refrigerant, the refrigerant passes from an outlet pipe across the header and into a complementary inlet pipe, thence to the inlet chamber, through the opening 11 to the outlet chamber, and back again into the outlet pipe.

The rear end of the header is closed, but at its front end a suction pipe 24 is connected, and this pipe extends forwardly through the upper part of the storage space, thence through the back and front walls of the tank 6, with suitable packed joints in the walls. At the front of the brine tank the suction pipe terminates in a gage or water-glass 25, which, together with the gooseneck pipe 26 forms a siphon, or bend, above the top of the tank. The siphon pipe, as indicated in Figure 1 extends down through the roof or top of the cab C and is connected with a suitable pump 27 that is readily accessible to the driver of the vehicle, and under his control for initiating the circulation of the brine from the tank, through the coil, and back to the tank.

The tank may be supported in suitable manner in the upper, front part of the truck, as by brackets 28, and troughs as 29 are preferably employed below the pipes of the coil to catch drippings of moisture from the exterior of the coil. The troughs or gutters are located beneath the coil and spaced from the pipes by spacing pins as 29', and hangers or straps 30 are attached to the roof of the truck to support the coil. A down-spout 31 is indicated in Figures 1 and 3 for carrying off the moisture collected in the gutters or troughs, and the moisture is disposed of in suitable manner.

Under some conditions the equipment may be converted from a refrigerating apparatus to a heating or warming system, and for this purpose I provide a coupling at 32 in Figure 4 to which a hot water pipe may be connected, and from a suitable source, hot water may be supplied to the tank and the coil.

In the initial operation of the circulating system, the tank is first supplied with a quantity of salt water sufficient to fill the sumps 22 and the coil, and then the suction pump 27 is operated to create suction in pipe 24, the header 23 and the coils, and as a result, the atmospheric pressure in the tank lifts the brine from the sumps through the spouts 21 into the coil until the latter is filled and the gage 25 indicates a water level therein, it being understood that the sumps remain filled with water and of course a slight depth of water may be contained in the bottom of the tank.

The two compartments I and O of the tank are now supplied with salt water or brine and ice in sufficient quantities to produce a predetermined degree of temperature in the interior of the truck. As the ice in the compartments melts, the water mixes with the brine in the tank, and the level of brine in the tank gradually rises, the coils and header remaining filled with the brine, and the siphon 26 forming a seal against escape of brine. The pump 27 will form an effective barrier against escape of the brine from the header.

When the vehicle gets under way, the first swaying movement to the left causes the gate 12 to open thereby permitting brine to flow through the opening 11 from chamber I to chamber O and when the vehicle returns to level position, the gate is closed thereby causing a difference in the levels of brine in the two compartments. As the water seeks a common level in the two compartments, the flow starts at the sumps in chamber O, thence through the pipes 19, across the header 23, into and through the pipes 20 and thence to the inlet compartment, and with each recurring side sway of the vehicle to the left an impulse is given to the brine causing it to automatically flow from the outlet chamber through the coil to the inlet chamber.

In order to secure a maximum clearance or head-room in the upper part of the truck body, the pipes of the coil, and the header are flattened, as indicated, and thus ample exterior surface is provided for the coil to absorb heat from the interior of the truck, and preferably the coil and header are fashioned of galvanized steel pipes to insure durability and to insure proper sanitary conditions and cleanliness.

Having thus fully described my invention, what I claim as new and desire to secure by Letters Patent is:—

1. In a liquid circulating system responsive to the side swaying of a vehicle, the combination with a tank having a partition forming an outlet chamber and an inlet chamber and said partition having an opening therethrough, and a gravity actuated gate for closing said opening, of a coil comprising a plurality of pipes connected with the inlet chamber, a complementary set of pipes connected with the outlet chamber, a header to which adjoining ends of the two sets of pipes are connected, said coil being located above the opening in the partition, and means for initiating a priming flow of refrigerant through said coil.

2. In a refrigerating system responsive to the side swaying of a vehicle, the combination, with a tank having an outlet chamber and an inlet chamber and gravity actuated means for preventing flow from the former to the latter chamber, of a coil elevated with relation to said tank and comprising pipes in communication with extensions of the chambers projecting below the bottom of the tank, and means for producing suction in the coil to initiate a priming flow of refrigerant to said coil.

3. The combination with a tank having separate compartments and a gate therebetween, of an elevated coil having terminals located in extensions of the compartments projecting below the bottom of the tank, and means for producing suction in the coil to initiate a priming flow of liquid from the tank to the elevated coil.

4. In a refrigerating system responsive to vehicle movement, the combination with a tank having a ported partition forming inlet and outlet chambers, and a gate for the partition, of an elevated coil comprising two sets of pipes in communication at one end of the coil, a plurality of sumps extended below the bottom of each chamber, and the pipes at the other end of the coil terminating within said sumps.

5. In a refrigerating system responsive to vehicle movement, the combination with a tank having a ported partition forming inlet and outlet chambers, a gate for the ported partition, and an open sump in each chamber extended below the bottom of the tank, and a gate for the ported partition, of an elevated coil having one end terminating in one sump and its other end terminating in the other sump, and means for initiating a priming flow of liquid refrigerant from the tank to the elevated coil.

6. In a refrigerating system responsive to vehicle movement, the combination with a tank having a ported partition forming inlet and outlet chambers, a gate for the ported partition, and a series of sumps for each chamber below the bottom of the tank, of an elevated header, a siphon connected to the header and a pump for the siphon, a series of inlet pipes connected at one side of the header and a series of outlet pipes connected at the other side of the header, and a downwardly extending spout on each pipe terminating in a sump.

GEORGE E. ADAMS.